(12) United States Patent
Seo

(10) Patent No.: US 7,085,331 B2
(45) Date of Patent: Aug. 1, 2006

(54) APPARATUS AND METHOD FOR PROCESSING DATA USING COPSK OF WIRELESS COMMUNICATION SYSTEM

(75) Inventor: Bo-Hong Seo, Gyeonggi-do (KR)

(73) Assignee: Curitel Communications, Inc. (KR)

( * ) Notice: Subject to any disclaimer, the term of this patent is extended or adjusted under 35 U.S.C. 154(b) by 755 days.

(21) Appl. No.: 10/165,709

(22) Filed: Jun. 7, 2002

(65) Prior Publication Data

US 2002/0186786 A1 Dec. 12, 2002

(30) Foreign Application Priority Data

Jun. 9, 2001 (KR) .............................. 2001-32356

(51) Int. Cl.
*H04L 27/18* (2006.01)
*H04L 27/20* (2006.01)

(52) U.S. Cl. ...................................... 375/308; 375/146
(58) Field of Classification Search ................ 375/302, 375/303, 305, 308, 316, 322, 323, 329, 334, 375/295, 298, 146
See application file for complete search history.

(56) References Cited

U.S. PATENT DOCUMENTS 6,724,740 B1 * 4/2004 Choi et al. .................. 370/335

FOREIGN PATENT DOCUMENTS

| EP | 1 005 202 A2 | 5/2000 |
|---|---|---|
| GB | 2 300 545 A | 11/1996 |
| GB | 2 336 976 A | 11/1999 |
| JP | 2001-156679 | 6/2001 |
| WO | WO 01/41318 A2 | 6/2001 |

OTHER PUBLICATIONS

Japanese Office Action dated Feb. 10, 2006; JP Patent Application No. 2002-169135.
European Search Report dated Apr. 3, 2006; EP Patent Application No. 02254026.4.

* cited by examiner

*Primary Examiner*—Kevin Burd
*Assistant Examiner*—Freshteh Aghdam
(74) *Attorney, Agent, or Firm*—Blakely Sokoloff Taylor & Zafman

(57) ABSTRACT

An apparatus and method for processing data using the complex quadrature phase shift keying (CQPSK) is disclosed. The present invention includes plurality of multiplying units for multiplying a long pseudo noise (PN) code with an in-phase pseudo noise and quadrature pseudo noise, and a results of multiplying with a pilot channel, a dedicated control channel, a voice channel, a high-speed data transmission channel, a result multiplied with channels with gain, filtering units for eliminating noise, subtracting and adding units for calculating final result, and in-phase/quadrature channel outputting unit for outputting I-channel/Q-channel. The present invention can improve data processing speed of a radio channel, increase capacity of data processing in radio communication and also can be applicable to various kinds of radio communication devices transceiving voice, media contents and high-speed data at a same time.

5 Claims, 5 Drawing Sheets

APPARATUS AND METHOD FOR PROCESSING DATA USING COPSK OF WIRELESS COMMUNICATION SYSTEM

FIELD OF THE INVENTION

The present invention relates to an apparatus and method for processing data based on a complex quadrature phase shift keying (CQPSK) for improving data processing speed of a radio channel and providing high quality data.

In other words, the present invention improves a processing speed of modulated/demodulated data for providing high-quality data service by embodying a modulation/demodulation method of a modulator/demodulator (MODEM) in a mobile station as an application specific integrated circuit (ASIC). Also, the present invention is applicable to various kinds of radio communication devices transceiving voice, media contents and high-speed data at the same time.

DESCRIPTION OF RELATED ARTS

A modulator/demodulator (MODEM) is a device that converts digital signals generated in a computer to analog signals to transmitted through a telephone network and reverse converts the analog signals received through the telephone network to the digital signals.

A typical telephone line and dedicated line are for voice data only therefore, there occurs lots of attenuation in transmission of the digital signal. For transmitting digital signal to other party more than 50 feet away, the MODEM is necessary to equip in two terminals. The MODEM includes two major parts, a transmitting unit and a receiving unit.

At the transmitting unit, digital signals are inputted to an encoder and scrambled. The scrambled signals are inputted to a modulator. At the modulator, the digital signals "1" or "0" are modulated to carrier-frequency ranging about 1700–1800 Hz. After that, they are converted to analog signals. The analog signals are transmitted to a communication line after passing through a band pass filter.

At the receiving unit, the analog signals received from the communication line are passed through the band pass filter. The band pass filter allocates a desired frequency band. After allocation, the signals are passed to an automatic gain control (AGC) and divided in proper size. The analog signals are demodulated by a demodulator and converted to digital signals. The digital signals are decoded for restoring to original data.

In modulation/demodulation methods, an amplitude modulation (AM), frequency modulation (FM) and phase modulation (PM) are used for analog type and a frequency shift keying (FSK), amplitude shift keying (ASK), phase shift keying (PSX), quadrature phase shift keying (QPSK) and complex quadrature phase shift keying (CQPSK) are used for digital type.

A quadrature phase shift keying (QPSK) has been used as a conventional modulation/demodulation method in a wireless communication system. The quadrature phase shift keying is not adequate for effectively processing tons of data. Next-generation mobile communication demands to process not only simple and low speed transmission data such as voice or text but also complex and large capacity data such as media contents, Internet contents or visual data. The data processing speed depends on the modulation/demodulation method of the MODEM in the mobile station and a conventional method of modulation/demodulation does not satisfy the above-mentioned demand of the next-generation mobile communication.

Therefore, for embodying a mobile station for the next-generation mobile communication, it is required that a modulation/demodulation method can process various channels including a voice, a video, a control, and dedicated control channel, in other words, channels having various transmission rate.

SUMMARY OF THE INVENTION

It is, therefore, an object of the present invention to provide an apparatus and method for processing data based on a complex quadrature phase shift keying (CQPSK) for improving data processing speed of a radio channel and providing high quality data.

In accordance with an aspect of the present invention, there is provided a method for an apparatus for processing data in a radio communication system bared on a complex quadrature phase shift keying, including; a first multiplying unit for multiplying a long pseudo noise (PN) code and multiplying with an in-phase pseudo noise (Ipn) and quadrature pseudo noise (Qpn) thereby generating a long in-phase PN code and a long quadrature PN code; a second multiplying unit for multiplying the long in-phase pseudo PN code with a pilot channel (PI), a dedicated control channel (DC), a voice channel (FD) and a high speed data transmission channel (SM); a third multiplying unit for multiplying the long quadrature PN code with a pilot channel (PI), a dedicated control channel (DC), a voice channel (FD) and a high speed data transmission channel (SM); first and second filtering unit for filtering the result from the second and the third multiplying unit to eliminate a noise controlling gains of filtered signals; fourth and fifth multiplying unit for multiplying each of filtered signal from the first and second filtering unit with a gain, and for generating a first to an eighth gain-controlled signals, wherein the first, the second, the seventh, the eighth gain controlled signals are a gain-controlled in-phase pilot channel signal, a gain-controlled in-phase dedicated control channel, a gain-controlled in-phase voice channel and a gain-controlled in-phase high-speed data transmission channel signals, and the third, the fourth, the fifth, the sixth gain controlled signals area gain-controlled quadrature pilot channel signal, a gain-controlled quadrature dedicated control channel, a gain-controlled quadrature voice channel and a gain-controlled quadrature high-speed data transmission channel signals; a subtracting unit for calculating a first result by adding the first gain-controlled signal and the second gain controlled signal, calculating a second result by adding the third gain-controlled signal and the fourth gain-controlled signal, and calculating a difference between the first and the second results; an adding unit for calculating a third result by adding the fifth and sixth gain-controlled signals, calculating a fourth result by adding the seventh and eighth gain-controlled signals and calculating a sum of the third and the fourth results; an in-phase channel outputting unit for outputting the result outputted from the subtracting unit as an in-phase channel (I-channel) signal; and a quadrature channel outputting unit for outputting the result outputted from the adding unit as a quadrature channel (Q-channel) signal.

In accordance with another aspect of the present invention, there is also provided a method for a method for processing data using a complex quadrature phase shift keying implemented to a wireless communication system, including steps of: a) multiplying a long pseudo noise (PN) code and multiplying with an in-phase pseudo noise code (Ipn) and quadrature pseudo noise code (Qpn), thereby generating a long in-phase PN code and a long quadrature PN code; b) multiplying the long in-phase pseudo PN code with a pilot channel (PI), a dedicated control channel (DC), a voice channel (FD) and a high speed data transmission channel (SM); c) multiplying the long quadrature PN code with a pilot channel (PI), a dedicated control channel (DC), a voice channel (ED) and a high speed data transmission channel (SM); d) filtering the result from the steps b) and c) to eliminate a noise; e) controlling gains of filtered signals by multiplying each of the filtered signals at step d) with a gain, and for generating a first to an eighth gain-controlled signals, wherein the first, the second, the seventh, the eighth gain controlled signals are a gain-controlled in-phase pilot channel signal, a gain-controlled in-phase dedicated control channel, a gain-controlled in-phase voice channel and a gain-controlled in-phase high-speed data transmission channel signals, and the third, the fourth, the fifth, the sixth gain controlled signals area gain-controlled quadrature pilot channel signal, a gain-controlled quadrature dedicated control channel, a gain-controlled quadrature voice channel and a gain-controlled quadrature high-speed data transmission channel signals; f) a first result by adding the first gain-controlled signal and the second gain controlled signal, calculating a second result by adding the third gain-controlled signal and the fourth gain-controlled signal, and calculating a difference between the first and the second results; g) calculating a third result by adding the fifth and sixth gain-controlled signals, calculating a fourth result by adding the seventh and eighth gain-controlled signals and calculating a sum of the third and the fourth results; and h) outputting the difference between the first and the second results as an in-phase channel (I-channel) signal and outputting the sum of the third and the fourth results as an quadrature channel (Q-channel) signal.

BRIEF DESCRIPTION OF THE DRAWING(S)

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
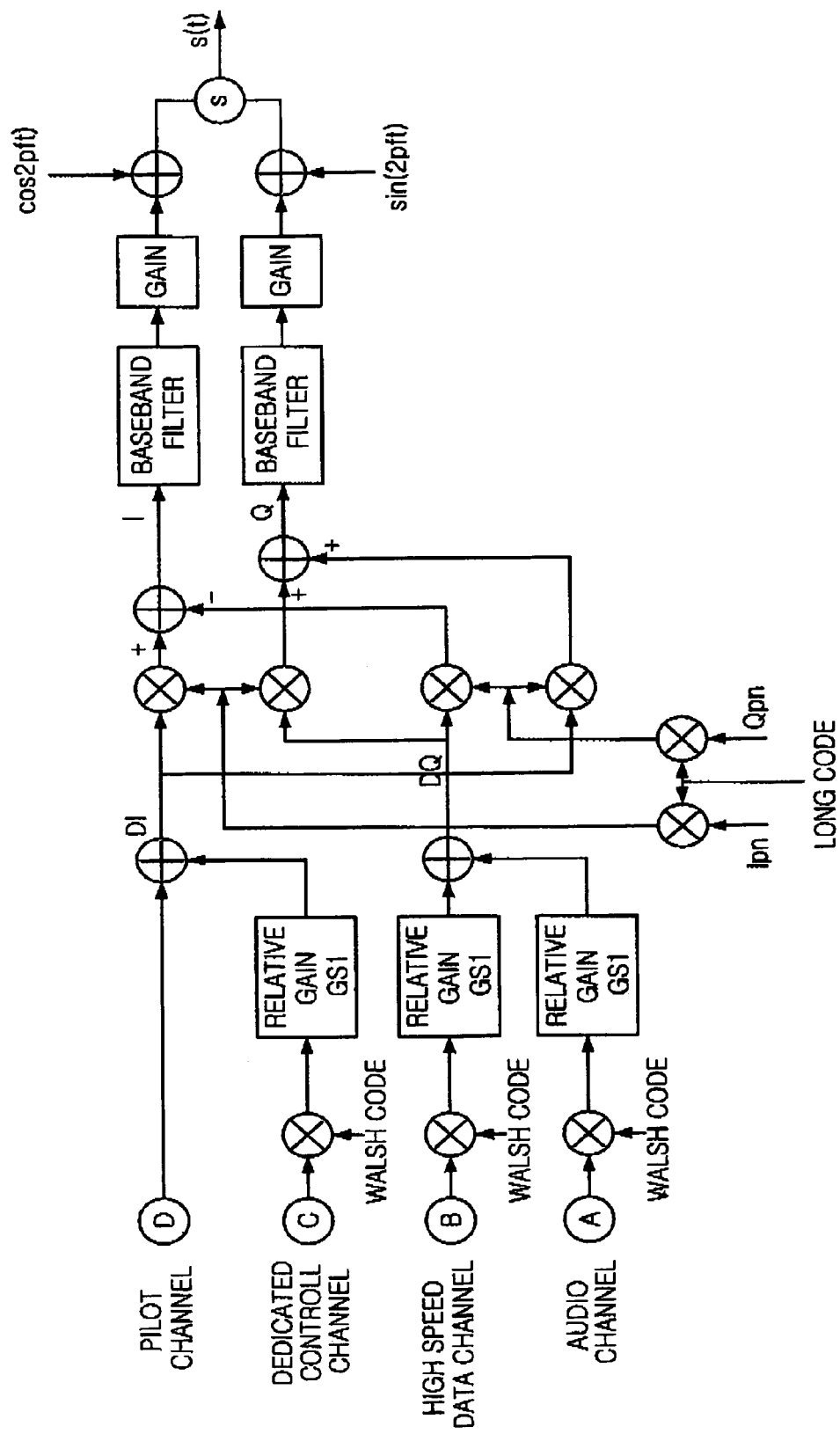
FIG. 1 is a diagram illustrating a complex quadrature phase shift keying and spreading method in which a preferred embodiment of the present invention is implemented.
Figure 2:
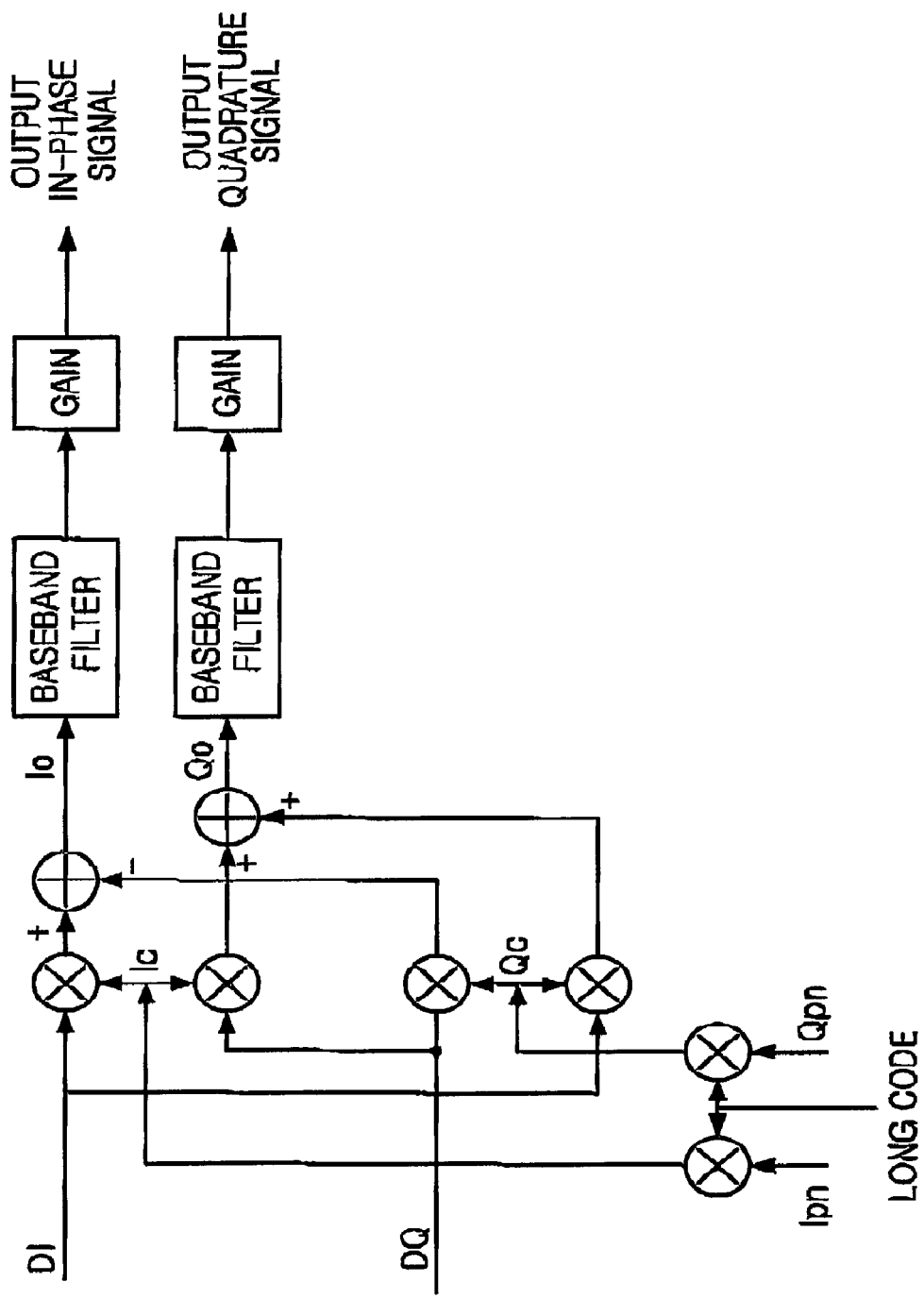
FIG. 2 is a diagram explaining a function of a complex quadrature phase shift keying in accordance with a preferred embodiment of the present invention.

FIG. 1 is a diagram illustrating a complex quadrature phase shift keying and spreading method in which a preferred embodiment of the present invention is implemented. There may be more than four channels but for the only easy description, in this specification, four channels are described as an example.

Referring to FIG. 1, a walsh code is multiplied to a dedicated control channel (R-DCCH), a high speed data transmission channel (R-SCH) and a voice channel (R-FCH) and a relative gain is multiplied. After that, a modulation of the complex quadrature phase shift keying (CQPSK) is performed by using in-phase pseudo noise (I-PN) code, quadrature pseudo noise (Q-PN) code and long pseudo noise (Long PN) code. Finally, modulated signals are generated by using a pulse shaping filter (FIR) and gain.

The walsh code is a coding method by using a walsh function, which is one of orthogonal binary functions for producing code division multiple access (CDMA) signals. "++--" is used for a reverse fundamental channel (R-FCH), "++++----" is used for a reverse dedicated control channel (R-DCCH), "+-" or "+-+-" is used for a reverse supplemental channel (R-SCH), wherein "+" represents 0 and "-" represents 1. Four patterns of the walsh code can be obtained by output of a 3-bits counter.

s(t) in FIG. 1, a final result, is a signal modulated by adding four channels and the signal can be demodulated to produce four channels.

An input of a block of the complex quadrate phase shift keying (CQPSK), which will be explained later, can be expressed as following equation.

$$Di = PI + DC$$

$$Dq = FD + SM \qquad \text{Eq. 1}$$

Herein, "PI" denotes a pilot channel, "DC" represents a dedicated control channel, "FD" is an abbreviation of "fundamental" and denotes a voice channel and "SM" is an abbreviation of "supplemental" and denotes a high speed data transmission channel.

Also, a pseudo noise (PN) spreading code (PN code) can be expressed as following.

$$Ic = Ipn \ XOR \ Lc$$

$$Qc = Qpn \ XOR \ Lc \qquad \text{Eq. 2}$$

Herein, "Ipn" denotes in-phase channel pseudo noise code (I-channel PN code), "Qpn" represents quadrature channel pseudo noise code (Q-channel PN code) and "Lc" represents the long pseudo noise code (Long PN code).

Therefore, the result of the complex quadrature phase shift keying (CQPSK) can be expressed below equation.

$$Io = Di \ XOR \ Ic - Dq \ XOR \ Qc$$

$$Qo = Di \ XOR \ Qc + Dq \ XOR \ Ic \qquad \text{Eq. 3}$$

Herein, To and Qo are expressed as mulit-bit so a multi-bit input filter needs to be used as a pulse shaping filter. However, it is possible to use a single-bit input filter by changing order of the CQPSK modulation and the filtering. For changing calculation order, a below equations are required.

At first, Io and Qo are calculated as following equations.

$$Io = (PI + DC) XOR \ IC - (FD + SM) XOR \ Qc$$

$$Qo = (PI + DC) XOR \ Qc + (FD + SM) XOR \ Ic \qquad \text{Eq. 4}$$

From the Eq. 4, Io and Qo can be expressed as following equations, if it is divided to 8 outputs having bit resolution.

$$Io = PI \text{ XOR } Ic + Dc \text{ XOR } IC - FD \text{ XOR } Qc - SM \text{ XOR } Qc$$

$$Qo = PI \text{ XOR } Qc + DC \text{ XOR } Qc + FD \text{ XOR } Ic + SM \text{ XOR } Ic \quad \text{Eq. 5}$$

According to a result of above-mentioned equations, the result of the CQPSK is divided to 8 outputs having 1-bit resolution and then each of the eight outputs passes to a baseband filter. An output signal of the filter is multiplied with a gain and added by above-mentioned equations.

Figure 3:
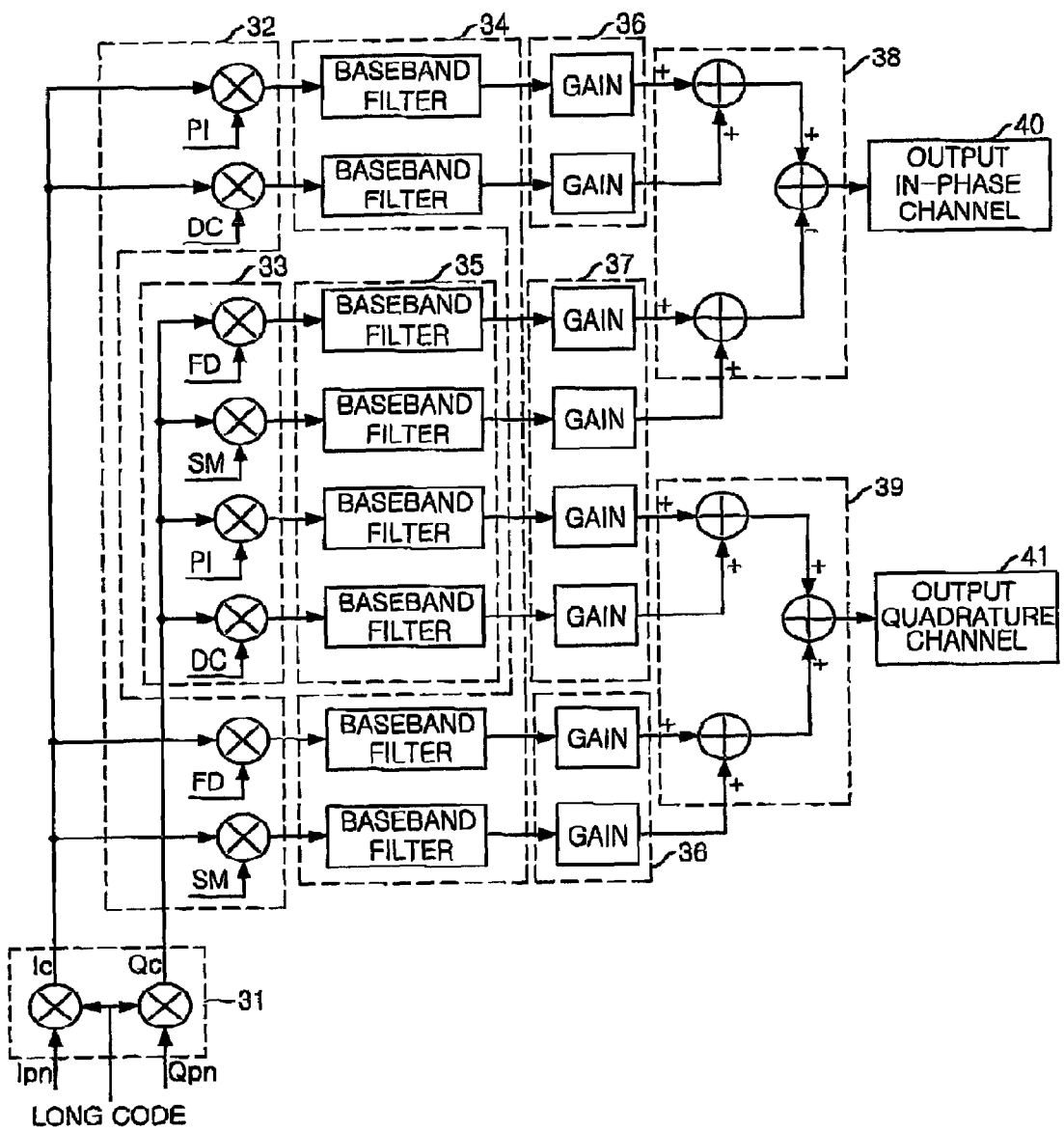
FIG. 3 is a diagram depicting an apparatus for data processing based on a complex quadrature phase shift keying in accordance with a preferred embodiment of the present invention.

FIG. 3 is a diagram depicting an apparatus for data processing based on a complex quadrature phase shift keying in accordance with a preferred embodiment of the present invention.

Referring to FIG. 3, the apparatus for data processing used on the complex quadrature phase shift keying (CQPSK) includes a first multiplying unit 31, a second multiplying unit 32, a third multiplying unit 33, a first and a second filtering units 34 and 35, a fourth and a fifth multiplying units 36 and 37, a subtracting unit 38, a adding unit 39, an in-phase channel output unit 40 and a quadrature channel output unit 41.

The first multiplying unit 31 receives a long pseudo noise (PN) code and multiplies it with an in-phase pseudo noise code Ipn and quadrature pseudo noise code Qpn.

The second multiplying unit 32 multiplies a result of the first multiplying unit 31 with the pilot channel PI received from a modem, the dedicated control channel DC, the voice channel FD and the high speed data transmission channel SM.

The third multiplying unit 33 multiplies a result of multiplied quadrature pseudo noise from the first multiplying unit 31 with the pilot channel, the dedicated control channel, the voice channel and the high speed data transmission channel.

The first and second filtering units 34 and 35 filter results of the second multiplying unit 32 and the third multiplying unit 33 to eliminate noises.

The fourth and fifth multiplying units 36 and 37 multiply a gain to results transmitted from the first and second filtering units 34 and 35 and generate a first to an eighth gained controlled signals, wherein the first, the second, the seventh and the eighth gain controlled signals are a gin-controlled in-phase pilot channel signal, a gain-controlled in-phase dedicated control signal, a gain-controlled in-phase voice channel signal and a gain-controlled in-phase high-speed data transmission channel signal, and the third, the fourth, the fifth, the sixth gain controlled signals are a gain-controlled quadrature pilot channel signal, a gain-controlled quadrature dedicated channel signal, a gain-controlled quadrature voice channel signal and a gain-controlled quadrature high speed data transmission signal, adding the third and fourth gained controlled signals, a third result is produced by adding the fifth and sixth gained controlled signals and a fourth result is produced by adding the seventh and eighth gained controlled signals.

The subtracting unit 38 produces a first result by adding the first and second gained controlled signals, produces a second result by adding the third and fourth gained controlled signals and calculates a difference between the first and second results.

The adding unit 39 calculates a third result by adding the fifth and sixth gained controlled signals, calculates a fourth result by adding the seventh and eighth gained controlled signals and calculates a sum of the third and fourth results.

The in-phase channel output unit 40 outputs in-phase channel (I-channel) according to the result outputted from the subtracting unit 38.

The quadrature channel output unit 41 outputs quadrature channel (Q-channel) according to the result outputted form the adding unit 39.

Operation steps of a preferred embodiment of the present invention having above-mentioned configuration is explained in detail as follows.

Figure 4:
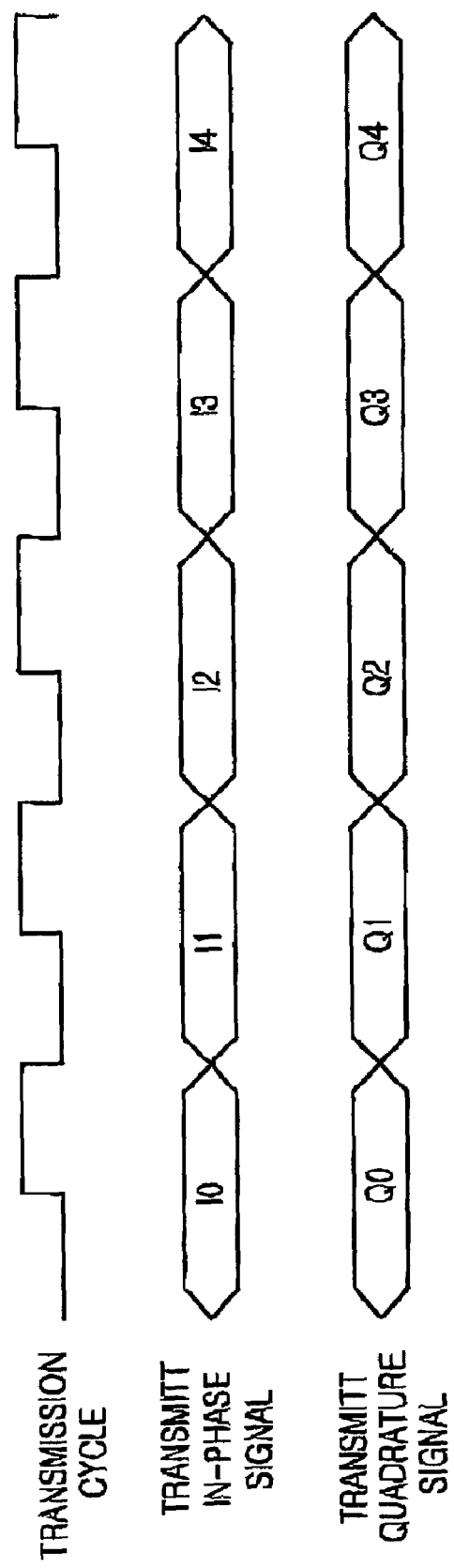
FIG. 4 is a timing diagram illustrating in-phase/quadrature data transmission in accordance with a preferred embodiment of the present invention.

A pulse shaping filter generates outputs according to transmit in-phase signals, transmit quadrature signals and transmission cycle. Since data output at a falling edge, data of transmit in-phase signal and transmit quadrature signal need to be received at a rising edge. It is illustrated at a timing diagram of FIG. 4.

Figure 5:
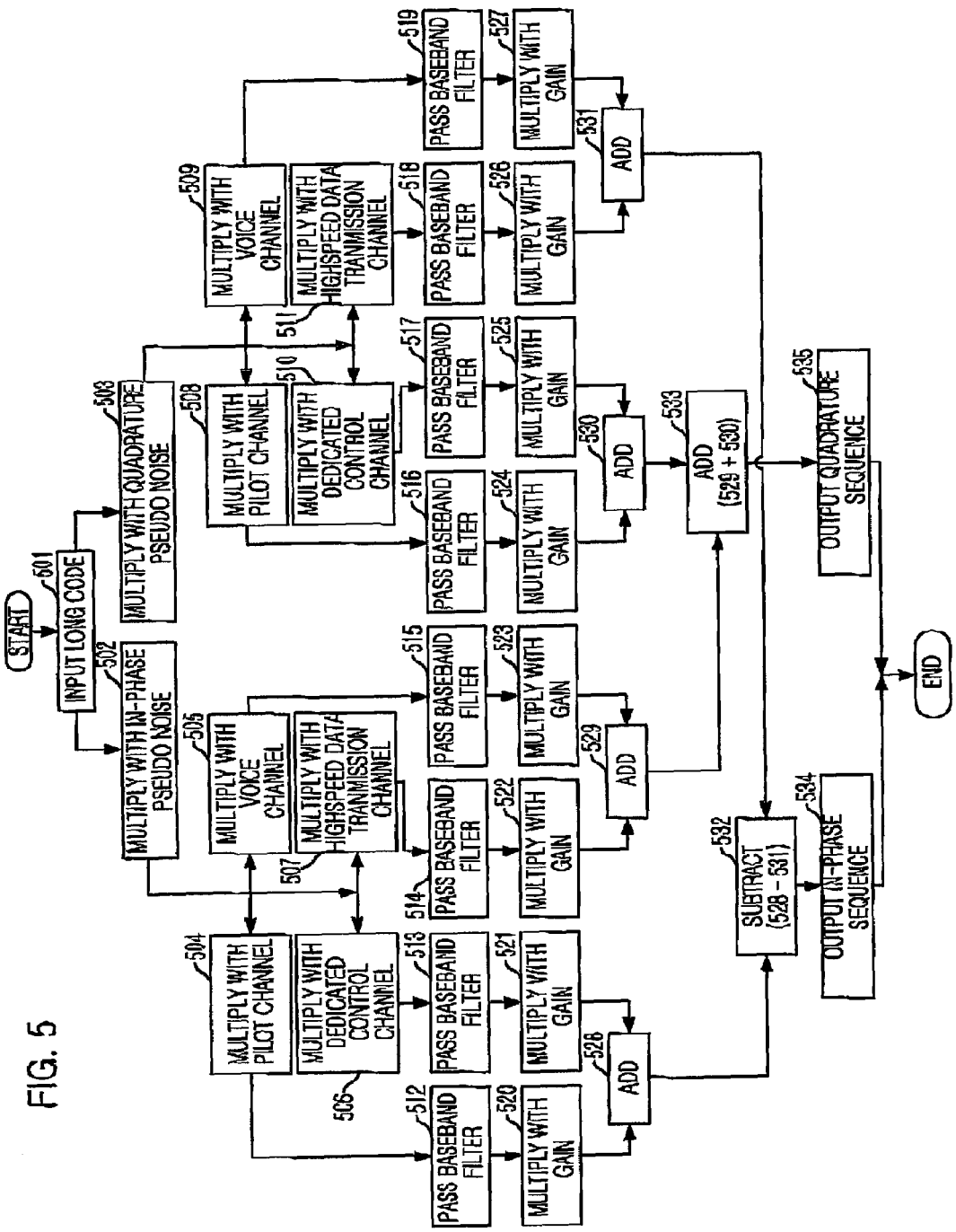
FIG. 5 is a flowchart representing a method for data processing based on a complex quadrature phase shift keying in accordance with a preferred embodiment of the present invention.

FIG. 5 is a flowchart representing a method for data processing based on a complex quadrature phase shift keying in accordance with a preferred embodiment of the present invention.

Referring to FIG. 5, for processing data based on the complex quadrature phase shift keying (CQPSK), at first, a long pseudo noise (PN) code is received at step 501 and multiplied with an in-phase pseudo noise code and quadrature pseudo noise code at steps 502 and 503.

Then, a result of the step 502 is multiplied with a pilot channel, dedicated channel, voice channel and high speed data transmission channel, which are four major channels of the next-generation modem, at steps 504 to 507.

Similarly, a result of the step 503 is multiplied with a pilot channel, dedicated channel, voice channel and high speed data transmission channel, which are four major channel of the next-generation modem, at steps 508 to 511.

After above-mentioned multiplying, the results of steps of 504 to 511 are passed to baseband filters at step 512 to 519 for eliminating a noise.

After eliminating the noise, the result of steps 512 to 515 are multiplied with gain at steps 520 to 523 for generating a gain-controlled in-phase pilot channel signal, a gain-controlled in-phase dedicated channel signal, a gain-controlled in-phase voice channel signal and a gain-controlled in-phase high speed data transmission channel and similarly, the result of steps 516 to 519 are multiplied with gain at steps 524 to 527 for generating a gain-controlled quadrature pilot channel signal, a gain-controlled quadrature dedicated channel signal, a gain-controlled quadrature voice channel signal and a gain-controlled quadrature high speed data transmission channel.

At step 528, the gain-controlled in-phase pilot channel signal generated at step 520 and the gain-controlled in-phase dedicated control channel signal generated at step 521 are added to produce a first result. The gain-controlled in-phase voice channel signal generated at step 522 and the gain-controlled in-phase high speed data transmission channel signal generated at stop 523 are added at step 529 to produce a second result. At step 530, the gain-controlled quadrature pilot channel signal generated at step 524 and the gain-controlled quadrature dedicated control channel signal generated at step 525 are added to produce a third result. The gain-controlled quadrature high speed data transmission channel signal generated at step 526 and the gain-controlled quadrature voice channel signal generated at step 527 are added at step 531.

An in-phase output sequence, one of final result of the present invention is calculated by calculating a difference between the first result of the step 528 and the fourth result of the step 531 at step 532 and a quadrature output sequence, other final result of the present invention is calculated by summing of the second and third results of the step 529 and step 530 at step 533.

At step 534, an in-phase sequence is outputted according to a calculation result of the stop 532 and a quadrature sequence is outputted according to a calculation result of the step 533 at step 535.

The above-mentioned present invention improves data processing speed of a radio channel and provides high quality data.

Therefore, the present invention can increase capacity of data processing in radio communication by providing improved modulation/demodulation method of modem in the mobile terminal using the complex quadrature phase shift keying.

While the present invention has been described with respect to certain preferred embodiments, it will be apparent to these skilled in the art that various changes and modifications may be made without departing from the scope of the invention as defined in the following claims.

What is claimed is:

1. An apparatus for processing data in a radio communication system based on a complex quadrature phase shift keying, comprising:
 a first multiplying means for multiplying a long pseudo noise (PN) code and multiplying with an in-phase pseudo noise code (Ipn) and quadrature pseudo noise code (Qpn) thereby generating a long in-phase PN code and a long quadrature PN code;
 a second multiplying means for multiplying the long in-phase pseudo PN code with a pilot channel (PI), a dedicated control channel (DC), a voice channel (FD) and a high speed data transmission channel (SM);
 a third multiplying means for multiplying the long quadrature PN code with a pilot channel (PI), a dedicated control channel (DC), a voice channel (FD) and a high speed data transmission channel (SM);
 first and second filtering means for filtering the result from the second and the third multiplying means to eliminate a noise controlling gains of filtered signals;
 fourth and fifth multiplying means for multiplying each of filtered signals from the first and second filtering means with a gain, and for generating first to eighth gain-controlled signals, wherein the first, the second, the seventh, and the eighth gain-controlled signals are a gain-controlled in-phase pilot channel signal, a in-phase dedicated control channel signal, a gain-controlled in-phase voice channel signal and a gain-controlled in-phase high-speed data transmission channel signal, respectively, and the third, the fourth, the fifth, and the sixth gain-controlled signals are a gain-controlled quadrature pilot channel signal, a gain-controlled quadrature dedicated control channel signal, a gain-controlled quadrature voice channel signal and a gain-controlled quadrature high-speed data transmission channel signal, respectively;
 a subtracting means for calculating a first result by adding the first gain-controlled signal and the second gain-controlled signal, calculating a second result by adding the fifth gain-controlled signal and the sixth gain-controlled signal, and calculating a difference between the first and the second results;
 an adding means for calculating a third result by adding the third gain-controlled signal and the fourth gain-controlled signal, calculating a fourth result by adding the seventh and eighth gain-controlled signals and calculating a sum of the third and the fourth results;
 an in-phase channel outputting means for outputting the result outputted from the subtracting means as an in-phase channel (I-channel) signal; and
 a quadrature channel outputting means for outputting the result outputted from the adding means as a quadrature channel (Q-channel) signal.

2. The apparatus as recited in claim 1, wherein said subtracting means calculates the first result by adding the first gain-controlled signal and the second gain-controlled signal, calculates the second result by adding the fifth gain-controlled signal and the sixth gain-controlled signal, and calculates a difference between the first result and the second result, which is expressed as:

$$Io=(PI+DC)\text{XOR } Ic-(FD+SM)\text{XOR } Qc \qquad \text{Eq. (1)}$$

where, "PI" denotes a pilot channel, "DC" represents a dedicated channel, "Ic" means "Ipn XOR Lc", "FD" is a voice channel, "SM" denotes a high speed data transmission channel and "Qc" means "Qpn XOR Lc".

3. The apparatus as recited in claim 1, wherein said adding means calculates the third result by adding the third gain-controlled signal and fourth gain-controlled signal, calculates the fourth result by adding the seventh and eighth gain-controlled signals and calculates a sum of the third result and the fourth result, which is expressed as:

$$Qo=(PI+DC)\text{XOR } Qc+(FD+SM)\text{XOR } Ic \qquad \text{Eq. (2)}$$

where, "PI" denotes a pilot channel, "DC" represents a dedicated channel, "Ic" means "Ipn XOR Lc", "FD" is a voice channel, "SM" denotes a high speed data transmission channel and "Qc" means "Qpn XOR Lc".

4. The apparatus as recited in claim 3, the filtering means includes a baseband filters each having 1-bit input.

5. A method for processing data using a complex quadrature phase shift keying implemented to a wireless communication system, comprising steps of:
 a) multiplying a long pseudo noise (PN) code and multiplying with an in-phase pseudo noise code (Ipn) and quadrature pseudo noise code (Qpn), thereby generating a long in-phase PN code and a long quadrature PN code;
 b) multiplying the long in-phase pseudo PN code with a pilot channel (PI), a dedicated control channel (DC), a voice channel (FD) and a high speed data transmission channel (SM);
 c) multiplying the long quadrature PN code with a pilot channel (PI), a dedicated control channel (DC), a voice channel (FD) and a high speed data transmission channel (SM);
 d) filtering the result from the second and the third multiplying means to eliminate a noise;
 e) controlling gains of filtered signals by multiplying each of the filtered signals at step d) with a gain, and for generating first to eighth signals, wherein the first, the second, the seventh, and the eighth gain-controlled signals are a gain-controlled in-phase pilot channel signal, a gain-controlled in-phase dedicated control channel signal, a gain-controlled in-phase voice channel signal and a gain-controlled in-phase high-speed data transmission channel signal, respectively, and the third, the fourth, the fifth, and the sixth gain-controlled signals are a gain-controlled quadrature pilot channel signal, a gain-controlled quadrature dedicated control channel signal, a gain-controlled quadrature voice channel signal and a gain-controlled quadrature high-speed data transmission channel signal, respectively;

f) calculating a first result by adding the first gain-controlled signal and the second gain-controlled signal, calculating a second result by adding the fifth gain-controlled signal and the sixth gain-controlled signal, and calculating a difference between the first result and the second result;

g) calculating a third result by adding the third gain-controlled signal and fourth gain-controlled signal, calculating a fourth result by adding the seventh and eighth gain-controlled signals and calculating a sum of the third result and the fourth result; and h) outputting the difference between the first result and the second result as an in-phase channel (I-channel) signal and outputting the sum of the third result and the fourth result as an quadrature channel (Q-channel) signal.

* * * * *